United States Patent Office 3,594,151
Patented July 20, 1971

3,594,151
HERBICIDALLY ACTIVE SPRAY COMPOSITION
Billy A. Sprayberry, Allentown, Pa., and Ted L. Curry, Anaheim, Calif., assignors to Diamond Shamrock Corporation, Cleveland, Ohio
No Drawing. Continuation-in-part of application Ser. No. 551,238, May 19, 1966. This application Nov. 12, 1968, Ser. No. 775,207
Int. Cl. A01n 9/00
U.S. Cl. 71—65         3 Claims

ABSTRACT OF THE DISCLOSURE

A pesticidally active composition for vegetation and insects, and particularly desirable for spray application, is prepared as a lump-free stable dispersion exhibiting thixotropic properties and having viscosity at a given solids content greater than the additive viscosities of individual components of the mixture at the same solids concentration. The preparative steps typically include forming an admix of 20–80 weight percent heteropolysaccharide and 80–20 weight percent locust bean gum, using this with a minor amount of surface active agent, combining these materials, preferably as a premixed homogeneous blend, with an organic liquid to prepare a free-flowing slurry, and mixing the slurry with an aqueous medium to make a sprayable system. Most pesticidal agents are then added to the sprayable system.

CROSS-REFERENCE TO RELATED APPLICATIONS

This application is a continuation-in-part of U.S. application Ser. No. 551,238, filed May 19, 1966, and now abandoned.

BACKGROUND OF THE INVENTION

A great number of pesticidal compositions are substances poisonous to desirable forms of life, e.g., mammals and desirable plant life, which life may nevertheless be subjected to the pesticidal compounds. This danger is magnified when the pesticide is applied from the air. One approach to solving this problem uses water-in-oil emulsions, i.e., invert emulsions. However, the use of invert emulsions has been rather limited since: special spraying equipment is required for the application of these high viscosity materials; and, only a limited number of pesticides are available for invert formulations. Thus, applicators often resort to the older, more time consuming, inefficient method of close range application. However, another problem with many pesticidal compositions is, that once successfully applied, they are often washed from the plant surface by rain before they can be effective.

Previously, it has been found that a mixture of a pesticide, a water-dispersible alginate, a finely-divided sorptive material and a water-miscible alcohol exhibited many desirable properties. For example, it retained pesticidal activity and resisted disintegration due to climatic conditions, as well as resisted drifting associated with aerial distribution of pesticides. These compositions have been disclosed in application Ser. No. 362,491, filed Apr. 24, 1964, now abandoned. It was found, however, that to obtain a smooth-flowing, stable, homogeneous dispersion of a pesticide plus water-dispersible alginate, it was necessary to mix these ingredients with a finely-divided sorptive material plus water-miscible alcohol containing one to six carbon atoms. While a homogeneous dispersion could thereafter be prepared by mixing with water, it was necessary for this composition to be in slurry form to achieve a lump-free dispersion. The drawback of a slurry mixture is the necessity of special containers to handle a semi-liquid composition, compared to the simple expedient of packaging a dry-blend material, plus the need to premix the slurry prior to its addition to the spraying medium to achieve a homogeneous distribution of ingredients.

SUMMARY OF THE INVENTION

It has now been found that a composition comprising a homogeneous mixture of a water-dispersible heteropolysaccharide prepared by the action of bacteria of the genus Xanthomonas on carbohydrates, hereinafter referred to as heteropolysaccharide, and locust bean gum when dispersed in an aqueous spraying medium forms a lump-free, stable dispersion which effectively can be mixed with a pesticidally active ingredient and sprayed for effective pest control. Such dispersions are smooth flowing and free of aggregates and coarse heavy particles thus permitting spraying with conventional nozzles and screens without clogging.

When the heteropolysaccharide-locust bean gum blend is mixed with a spraying medium, a thixotropic spray gel is formed, that is, the dispersion is liquid (low viscosity) while under agitation, e.g., while being pumped, but will revert to a gel (higher viscosity) when allowed to stand or upon application. This liquid-to-gel cycle can be repeated any number of times, enabling an applicator to start and stop application without fear of the system remaining either a liquid or gel. This reversibility also provides for a sufficiently viscous consistency to entrain and suspend the pesticidally active ingredient. Further, the system, unlike invert emulsions, can be used in most conventional ground rigs that are equipped with good mechanical agitation. When the system is subjected to a high shear stress, as when passing through a nozzle under pressure, it will permanently assume a greatly increased viscosity thus landing on plants in an enhanced state of gelation.

This increased viscosity after shear is higher than the additive viscosities of the individual components at the same solids content and is virtually irreversible. This feature enables an applicator to obtain excellent drift control even under adverse wind conditions that would have been prohibitive to the same application of conventional emulsions. Employing the heteropolysaccharide-locust bean gum composition blend in combination with a pesticidally active ingredient permits the pesticide to stick to the plant tissues. Because of the gel's resistance to drying, the pesticide is retained in its more active "hydrated" state for a long period of time. As the spray droplets begin to dry, a membranous film is formed encapsulating the pesticidally active ingredient, thus becoming further resistant to drying, while at the same time the membranous film is resistant to wash-off by rain.

Broadly, the invention is in part a process for preparing a pesticidally-active composition, for controlling insect pests and/or vegetation, adapted for spray application and having enhanced spray drift control, which process comprises the steps of: (A) mixing an admixture of about 20–80 weight percent locust bean gum and about 80–20 weight percent of a heteropolysaccharide, produced by the action of bacteria of the genus Xanthomonas on a carbohydrate, and about 0.1–10 weight percent of a surface active agent, basis 100 weight percent of such admixture, with an organic liquid in a weight ratio of liquid to admixture plus agent of from about 0.5 to 5:1, forming a free-flowing slurry of such admixture, agent, and liquid; (B) mixing a water-containing liquid diluent with 100 percent of solid, water-insoluble pesticidal agent for the pesticidally-active composition, and 0–100 percent of water soluble pesticidal agent for such pesticidally-active composition, thereby preparing a resulting liquid diluent; (C) blending the slurry with such resulting liquid diluent in an amount sufficient to produce a slurry-liquid diluent mixture for spray application; and (D) admixing the slurry-liquid diluent mixture with 100–0 percent of water soluble pesticidal agent, and 100 percent of liquid, water-emulsifiable pesticidal agent for such composition.

Further, the invention relates to a pesticidally active spraying composition prepared by the above-described method and to a method for controlling undesirable pests with such compositions.

DESCRIPTION OF THE PREFERRED EMBODIMENTS

It is to be understood that, as used hereinafter, the term "pesticide" or "pesticidal compositions" is meant to refer to those toxicological compositions which are efective in killing or controlling the growth of plants and insects. Thus it is intended that such terms refer broadly to those compositions commonly known as insecticides, defolinats, i.e., substances effecting plant metabolism without killing the plant, and herbicides. By the term "heteropolysaccharide" as used herein is meant to include the use of the polysaccharide in the form of the colloid and its salts; e.g., amine derivatives prepared by the method disclosed in U.S. Pat. No. 3,244,695.

Locust bean gum, also known carob bean gum or carob gum, is derived from *Ceratonia silique L.*, a tree widely cultivated in Southern Europe and the Mediterranean area as well as Northern Africa. Locust bean gum is produced by special treatment and refinement of the kernals or seeds, which generally involves removing and separating the tough seed coat before powdering of the endosperm, the latter constituting the entire mucilaginous portion of the seed. The gum is generally a pale buff-colored, odorless powder consisting of about 83% galactomannan. The locust bean gum employed should have substantially all of the gum particles in finely divided form.

The heteropolysaccharide is a high molecular weight exocellular material prepared by the action of bacteria of the genus Xanthomonas on carbohydrates. Representative species of these bacterial which may be employed to produce the heteropolysaccharides include *Xanthomonas begoniae, Xanthomonas campestris, Xanthomonas carotae, Xanthomonas coryline, Xanthomonas gummisudans, Xanthomonas hederae, Xanthomonas incanae, Xanthomonas lespedzae, Xanthomonas malvacearum, Xanthomonas holcicola, Xanthomonas papavericola, Xanthomas phaseoli, Xanthomonas pisi, Xanthomonas translucens, Xanthomonas vasculorum* and *Xanthomonas vesicatoria.* Studies have shown that the production of the heteropolysaccharides is a characteristic trait of members of the genus Xanthomonas but that certain species of the genus produce the polymers with particular efficiency. A preferred bacteria for preparing the heteropolysaccharide colloids useful in the present invention is the bacterial *Xanthomonas campestris.*

A variety of carbohydrates can be fermented with organisms of the genus Xanthomonas to produce the heteropolysaccharides used in the present invention. Suitable carbohydrates include glucose, sucrose, fructose, maltose, lactose, galactose, soluble starch, corn starch, potato starch and the like. Experience has shown that carbohydrates employed need not be in a refined state and may instead be utilized as crude materials derived from natural sources. Specific examples of materials that may be employed include raw sugar, crude molasses, sugar beet juice, raw potato starch and the like. Crude materials of this type are generally much less expensive than the corresponding refined carbohydrates and are therefore normally preferred for use as substrates in the preparation of the heteropolysaccharides.

The fermentation of the carbohydrate to produce the heteropolysaccharide is generally carried out in an aqueous medium containing from about one to about five weight percent or more of the carbohydrate. The medium may include, in addition to the carbohydrate, from about 0.1 to about 0.5 weight percent of dipotassium acid phosphate and from about 0.1 to about 10 weight percent of distiller's solubles or a similar nutrient containing suitable trace elements and organic nitrogen sources. Many of the crude carbohydrates referred to above contain the trace elements and organic nitrogen sources in sufficient quantities to permit satisfactory fermentation and hence the addition of distiller's solubles or similar nutrient is not necessary in all cases.

The fermentation reaction may be carried out in conventional equipment under aerobic conditions. The temperature is generally maintained between about 70° F. and 100° F. following inoculation of the medium with Xanthomonas organisms. As fermentation progresses, the viscosity of the medium increases rapidly due to the formation of the polysaccharide. The pH during fermentation is preferably maintained between about 6.0 and about 7.5 in order to secure maximum heteropolysaccharide yields. On completion of the reaction, generally about 48 hours or more, the crude heteropolysaccharide can be recovered by drying the fermentate or by precipitating the polymer from solution. Suitable precipitating agents include methanol, ethanol, acetone, calcium hydroxide, magnesium hydroxide, and the like. The precipitation procedures generally used result in the recovery of the polymer in the form of a potassium, sodium or similar salt rather than as the native heteropolysaccharide and may also lead to some deacetylation of the polymer molecule. The term "heteropolysaccharide" is employed herein to include these forms of the polymer as well as the native material. If desired, the polymer may be purified by filtering or centrifuging out the bacterial cells prior to precipitation of the polymer and thereafter repeatedly precipitating and washing the material to remove other impurities. The polymer is generally recovered as a thick viscous solution or a soft bulky powder having a dull yellow color. The preparation of the material is described in greater detail in U.S. Pat. No. 3,020,206.

The heteropolysaccharide-locust bean gum composition blend should contain, for most effective use of the pesticide, about 20% to 80%, preferably about 30% to 70%, by weight heteropolysaccharide with about 20% to 80%, preferably 30% to 70%, by weight locust bean gum. However, it has been found necessary to incorporate a small amount, e.g., 0.1% to 10%, preferably 0.5% to 5%, by weight, of a surface active agent along with the heteropolysaccharide-locust bean gum blend in the formulation of the spraying medium to achieve a homogeneous dispersion. Such surface active agents are preferably incorporated in solid form directly into the blend prior to mixing the blend with organic liquid; for instance, a suitable liquid surface active agent may be absorbed on an inert carrier which does not deleteriously affect the properties of the blend. However, a liquid agent may also be used by admixing it with the heteropolysaccharide-locust bean mixture and thereby absorbing it into the blend. Alternatively, the heteropolysaccharide-locust bean gum blend and the surface active agent can be added separately to the organic liquid to prepare the free-flowing slurry of such blend, agent, and liquid.

Numerous pesticidal agents and mixtures thereof may be used in combination with the heteropolysaccharide-locust bean gum-surface active agent pesticidal adjuvant composition, the nature of the agent selected being governed by the type of pest to be controlled. "Hormone," or "systemic," type compounds are widely used with highly successful results in agriculture for selective pest control in useful crops. These type compounds stimulate or modify plant growth when applied up to a certain concentration and act to retard or finally to kill the plant when applied at high concentrations. For instance, aryloxycarboxylic acid compounds, particularly the halo-aryloxycarboxylic acids, their esters and salts have been used as the active ingredient in pesticidal compositions.

Exemplary of the haloaryloxy-substituted acids (intended also to include their esters and salts) are o-chlorophenoxyacetic acid;
2,4-dichlorophenoxyacetic acid (2,4-D);
2,4,5-trichlorophenoxyacetic acid (2,4,5-T);
2,4,6-trichlorophenoxyacetic acid;
2,3,6-trichlorophenoxyacetic acid;
2,3,4,6-tetrachlorophenoxyacetic acid;
2,3,5,6-tetrachlorophenoxyacetic acid;
pentachlorophenoxyacetic acid;
p-bromophenoxyacetic acid;
2,4-dibromophenoxyacetic acid;
2,4,6-tribromophenoxyacetic acid;
p-iodophenoxyacetic acid;
p-fluorophenoxyacetic acid;
2,4-difluorophenoxyacetic acid;
4-chloro-o-toloxyacetic acid;
4-chloro-m-toloxyacetic acid;
4-chloro-2-ethyl-phenoxyacetic acid;
4-chloro-3,5-dimethyl-phenoxyacetic acid;
2-chloro-1-naphthoxyacetic acid;
2,4-dichloro-1-naphthoxyacetic acid;

a (2-chloro-1-naphthoxy)-propionic acid and the corresponding haloaryloxy derivatives of high aliphatic acids and the corresponding haloaryloxy derivatives of such unsaturated aliphatic acids as acrylic acid and its homologues.

Other common pesticidal materials are the following:

2,2-bis-(p-chlorophenyl)-1,1,1-trichloroethane,
1,2,3,4,10,10-hexachloro-exo-6,7-epoxy-1,4,4a,5,6,7,8,8a-octa-hydro-1,4,5,8,endo,
exo-dimethanonaphthaline,
sodium 2,4-dichlorophenoxyethylsulfate,
1,2,3,4,10,10-hexachloro-exo-6,7-epoxy-1,4,4a,5,6,7,8,8a-octahydro-1,4,5,7-endo,
endo-dimethanonaphthaline,
1,4,5,6,7,8,8-heptachloro-3a,4,7,7a-tetrahydro-4,7-endo-methanoindene,
S-(1,2-dicarboxyethyl)-O,O-dimethyl-phosphorodithioate,
O-p-nitrophenyl O,O-diethyl phosphorothioate,
dimethyl dichlorovinyl phosphate,
p-chlorophenyl-p-chlorobenzene sulfonate,
1,2,4,5,6,7,8,8-octachlor-2,3,3a,4,7,7a-hexahydro-4,7-methanoindene,
dichlorodiphenyl dichloroethane,
methoxychlor,
gamma benzene hexachloride,
1-isopropyl-3-m-ethyl pyrazolyl-5-dimethyl carbamate,
3-methyl-pyrazolyl dimethylcarbamate,
1,2,3,4,10,10-hexachloro-1,4,4a,5,8,8a-hexahydro-1,4-endo-exo-5,8-dimethanonaphthalene,
1,2,3,4,10,10-hexachloro-1,4,4a,5,8,8a-hexa-hydro-1,4-endo-endo-5,8-dimethanonaphthalene,
butyl phenoxyisopropyl chloroethyl sulfite, p-chlorophenyl sulphone,
dichlorophenyl benzenesulphonate,
dimethyl parathion,
O,O-diethyl-O-2-ethylmercaptoethylthiophosphate,
octamethyl pyrophosphoramide,
O,O - diethyl bis(dimethylamido)pyrophosphate, sym., and unsym.,
diethoxythiophosphoryl tetramethyldiamido phosphate,
alpha-diethoxyphosphinodithioacetylurea,
alpha-dimethoxyphosphinodithioacetylurea,
diethoxyphosphinodithioacetamide,
dimethoxyphosphinodithioacetamide,
bis(dimethylamido) phosphoryl azide,
2-chlorovinyl diethyl phosphate,
sodium selenate,
potassium selenate,
sodium fluoroacetate,
isopropyl N-(3-chlorophenyl) carbamate,
3-(3,4-dichlorophenyl) 1,1-dimethylurea,
3-(p-chlorophenyl)-1,1-dimethylurea,
2-chloro-4,6-bis(ethylamino)-5-triazine,
3-amino-1,2,4-triazole,
O,O-diethyl S-(ethylthio) methyl phosphorodithioate,
O-(4-tert-butyl - 2 - chlorophenyl)O-methyl methyl phosphoramidothionate and its oxygen analog, and various biologically active inorganic salts such as sodium arsenate, calcium arsonate, and the like.

Solid, water-insoluble pesticidal agents, typically available as wettable powders containing surface active agent and, for example 25–80 weight percent of active ingredient such as 3-phenyl-1,1-dimethyl urea, 5-bromo-3-sec-butyl-6-methyluracil, and 3-(p-chlorophenyl)-1,1-dimethylurea, must be mixed directly with water-containing liquid diluent prior to the addition of the adjuvant slurry. Otherwise, the addition of the slurry to the liquid diluent prior to the addition of such solid, water-insoluble pesticides results in a lumpy, non-uniform final mixture for spray application which may produce clogging of screens and nozzles. Water soluble agents, both liquid and solid, may be added to the liquid diluent before or after addition thereto of the adjuvant slurry. Water-emulsifiable liquid agents should be added to the water-containing liquid diluent after mixing such diluent with the slurry to enhance preparation of a uniform final mixture for spray application.

The adjuvant composition, preferably premixed as an admixture of heteropolysaccharide-locust bean gum blend plus surface active agent, is added to an organic liquid in a weight ratio of liquid-to-adjuvant, i.e., liquid-to-premixture, of about 0.5 to 5:1, preferably about 1 to 3:1, with continuous stirring so that a smooth flowing slurry is produced. This heterogeneous mixture is then slowly poured into an aqueous medium, typically containing pesticidal agents, i.e., all of the solid, water-insoluble agents, and which may contain, for example, water soluble agents with continuous agitation of the mixture. In less than 10 minutes after all ingredients are together, the system will attain gel-like properties with the pesticide uniformly dispersed throughout a thixotropic system. For example, a typical resulting system of about .05 percent solids content ready for spray application but in an undisturbed condition will exhibit a viscosity decrease after a few minutes of moderate agitation from a viscosity of greater than 7,000 centipoises down to a viscosity below 5,000 centipoise.

The choice of an appropriate organic liquid is determined largely by the concentration of active ingredient which is desired to be employed, by the volatility required in a liquid and the cost of same. However, such organic liquid is preferably one, or a blend of same, which is liquid above 20° F. and remains liquid above about 150° F. for enhanced employment of such liquid under varying climatic conditions. Most often the organic liquid is simply a petroleum product, including dormant-spray oils, verdant-spray oils, and insecticide-base oils, that is, typically highly refined grades of light kerosene fractions as well as conventionally and highly refined paraffin-base oils, and solvent-refined mixed-base stocks, many of which oils have viscosities at 100° F. between about 40–150 Saybolt Universal seconds. Other petroleum products for the organic liquid include weed-control oils including light oils, medium oils and heavy oils, that is, refined naphthas generally boiling between 300–400° F., thermally and catalytically cracked distillate oils for general deweeding, and cracked residual oils for typically railroad-track deweeding and like applications. Among the other suitable organic liquids which can be employed there may be mentioned ketone and cyclohexanone; chlorinated hydrocarbons, such as carbon tetrachloride, chloroform, trichlorethylene, perchlorethylene; esters such as ethyl acetate, amyl acetate and butyl acetate; the monoalkyl ethers of ethylene glycol, e.g., the monomethyl ethers and the monoalkyl ethers of diethylene glycol, e.g., the monoethyl ether; alcohols such as ethanol, isopropanol and amyl alcohol, etc.

Typical classes of surface active agents which may be employed include anionic, cationic, amphoteric or nonionic type, and include alkyl sulfonates, alkylaryl sulfonates, alkyl sulfates, alkylamide sulfonates, alkylaryl polyether alcohols, fatty acid esters of polyhydric alcohols, ethylene oxide addition products of such esters; addition products of long chain mercaptans and ethylene oxide; sodium alkyl benzene sulfonates having 14 to 18 carbon atoms, alkyl phenol-ethylene oxides, e.g., p-isooctyl phenol condensed with 10 ethylene oxides units; and soaps, e.g., sodium stearate and sodium oleate. Specific surface active agents are those listed in articles by McCutcheon in "Soap and Chemical Specialties," vol. 31, Nos. 7–10 (1955).

The pesticidal composition is applied in an amount sufficient to exert the desired pesticidal action. The amount of the active ingredient present in the composition as actually applied for destroying, preventing, or controlling weeds or pests will vary with the manner of application, the particular weed or pest for which control is sought, the purpose for which the application is made, and like variables. In general, the pesticidally active ingredient may be present in the pesticidal adjuvant composition in an amount ranging from about 0.01% to 99%, preferably 0.1% to 95%, by weight. For instance, a typical pesticidal formulation may contain about 0.03% to 10% of the total by weight, preferably 0.03% to 7%, by weight of the pesticidally active ingredient; about 0.2% to 1% of the total, by weight, preferably 0.4% to 0.8%, by weight, pesticidal adjuvant composition. The remaining 99.77% to 89%, preferably 99.6% to 92.2%, by weight comprises the organic liquid and liquid diluent aqueous medium.

For economy the liquid diluent aqueous medium is preferably water. However, such liquid diluent aqueous medium may also be a liquid wherein water supplies the major portion, and for economy advantageously more than about 60 volume percent, of the medium with the balance being supplied by an organic liquid such as one or more of the organic liquids discussed hereinabove for use in preparing a free flowing slurry of admixture, surface active agent, and organic liquid. Thus, a minor amount of the liquid diluent aqueous medium can be typically supplied by various spray oils and insecticide-base oils as well as various weed control oils. In formulation, a volume ratio of slurry to liquid diluent of less than about 0.01:1 may provide too little admixture for significant enhanuement of spray drift control and the like. A volume ratio of slurry to liquid diluent of greater than about 0.1:1 can be uneconomical.

When the mixture is ready for spray application it can be applied through all sizes of nozzle orifices but preferably, for extended useful nozzle life, e.g., suppressed plugging, the nozzle has an approximate orifice diameter of not substantially less than about 0.06 inch. The nozzle can be of any type, e.g., full cone pattern, hollow cone pattern, flooding nozzles, and flat spray nozzles. Examples of suitable spray equipment include backpack knapsack sprayers, 3,000-gallon tank commercial sprayers, conventional booms mounted on aerial and ground rigs, and even air carriers.

When the mixture, prepared for spray application is used with such syray equipment, including any nozzle type, and for example those more particularly mentioned hereinabove, the pesticidal application is accompanied by excellent drift control even under adverse wind conditions. Additionally, such application can be intermittent with the mixture while being pumped, i.e., under agitation, exhibiting the low viscosity of a liquid, but such mixture in the spray equipment, when agitation ceases, exhibiting the higher viscosity of a gel.

This reversibility, while always providing a continuous, sufficiently viscous consistency to entrain and disperse even insoluble pesticidally-active ingredients, may also be repeated any number of times by the applicator without concern for the sprayable mixture within the equipment irreversibly reaching a gelled condition.

In order that those skilled in the art may more completely understand the present invention and the preferred methods by which the same may be carried into effect, the following specific examples are offered.

EXAMPLE 1

A heteropolysaccharide is prepared from the bacterium specie *Xanthamonas compestris* by whole culture fermentation by inoculating a medium containing 2% to 5% commercial glucose, an organic nitrogen source, dipotassium hydrogen phosphate and trace elements. Corn steep liquor or distiller's dry solubles may be used as the organic nitrogen source. Incubation is effected under aerobic conditions in approximately 96 hours at 80° F.

The culture growth is carried out in two intermediate stages prior to final inoculation to encourage vigorous growth of the bacteria. The pH of the media of the stages is about 7. In the first stage an agar slant is transferred to a dilute glucose broth and the bacteria cultured for 24 hours under vigorous agitation and aeration at 86° F. The culture produced is used to inoculate a 3% broth of glucose in a second intermediate stage. The reaction is carried out for 24 hours under vigorous agitation and aeration at 86° F. The culture so prepared is added to a final glucose medium comprising for example, 3% glucose, 0.5% distiller's dry solubles, 0.5% dipotassium phosphate, 0.1% magnesium sulfate heptahydrate. Incubation is carried out with vigorous agitation and aeration at 86° F. The resultant material is precipitated with methanol, after clarifying the mixture from the fermentation. Alternatively, the material can be recovered by drying without using the methanol by using, for example, 40 p.s.i. steam in a drum dryer or it may be spray dried. The resultant product is a pseudoplastic, heteropolysaccharide, hydrophilic colloid.

In this method of loopful of *Xanthomonas compestris* from an agar slant is adequate for the first stage with 200 ml. of glucose media. In the second stage the material from the first stage is used with nine times its volume of a 3% by weight glucose medium. In the final stage the second stage material and nineteen times its volume of the glucose media are employed.

EXAMPLE 2

To demonstrate the unexpected gelling characteristics of the heteropolysaccharide-locust bean gum blend a series of viscosity measurements are made in an aqueous system containing varying amounts of the hydrophilic coilloid alone, the locust bean gum alone and a blend of heteropolysaccharide and locust bean gum. The heteropolysaccharide employed is Kelzan-T, sold by the Kelco Company, San Diego. This heteropolysaccharide is prepared from the bacteria specie *Xanthomonas compestris* and has a moluecular weight in excess of 200,000 and has recurring units of D-glucose, D-mannose and the potassium salt of D-glucuronic acid in a ratio of 2.8:3.0:2.0. The locust bean gum employed is Amatex 923, sold by General Mills, Inc., Minneapolis, Minn., and has the following specifications:

Moisture—13.0% maximum
Protein (Kjedahl)—5.5% maximum
Fat—1.0% maximum
Ash—1.0% maximum
Granulation:
  Thru 60—98.0% minimum
  Thru 100—80.0% minimum
  Thru 200—30.0% maximum
  Thru 325—20.0% maximum The heteropolysaccharide-locust bean gum blend contains 40% heteropolysaccharide and 60% locust bean gum. The viscosity measurements are made in an aqueous medium containing water at 20° C. on a Brookfield Viscometer employing a #3 spindle at 6 r.p.m. The results are tabulated in Table I, below.

TABLE I

| Percent solids: | 100% Kelzan-T | 100% Amatex-923 | 40% Kelzan-T/ 60% Amatx-923 |
|---|---|---|---|
| 0.25 | 72 |  | 190 |
| 0.50 | 620 | 12 | 1,000 |
| 0.75 | 1,700 | 72 | 4,000 |
| 1.00 | 3,100 | 330 | 7,600 |
| 1.25 | 4,400 | 1,700 | 12,500 |

It can be readily observed that at any particular solids content the viscosity of the homogeneous adjuvant blend is much more than the additive affect of the individual components of the blend. For instance, at a 1% solids content the viscosity of the Kelzan-T is 3100, the viscosity of the Amatex–923 is 330; however, the viscosity of a homogeneous blend of 40% Kelzan-T and 60% Amatex–923 at the same solids content is 7,600 or more than twice as high as the additive viscosity values of the individual components.

EXAMPLE 3

This example is included to demonstrate the viscosities attained at solids content of 0.5%, 0.6% and 0.75% employing various blends of Kelzan-T and Amatex–923. The viscosities are measured following the procedure of Example 2. The results are reported in Table II, below.

TABLE II

| Blend | Viscosity at 0.5% solids content | Viscosity at 0.6% solids content | Viscosity at 0.75% solids content |
|---|---|---|---|
| Kelzan-T/Amatex: | | | |
| 0/100 | | 50 | 70 |
| 10/90 | | | |
| 20/80 | | | |
| 30/70 | 1,010 | 1,500 | 2,900 |
| 40/60 | 1,000 | 2,800 | 4,000 |
| 50/50 | 900 | 2,400 | 4,300 |
| 60/40 | 800 | | 2,900 |
| 70/30 | 750 | 1,650 | 2,200 |
| 80/20 | | | |
| 90/10 | | | |
| 100 | 650 | 1,450 | 1,700 |

Moreover, viscosity after shear of, for example, a 0.5% solids mixture containing a homogeneous blend of 40% Kelzan-T and 60% Amatex-923, which mixture is sheared in a Waring blendor at high speed, shows an increase in viscosity for the sheared mixture of over 1300%, when viscosity is measured according to the Example 2 procedure. This viscosity increase from such shear, which is deemed to be comparable to that exhibited after typical spray application of the mixture, is found, upon subsequent viscosity measurement 48 hours following shear, to be virtually constant, thereby demonstrating the irreversible character of the viscosity increase.

EXAMPLE 4

A mixture comprising 40 pounds of Kelzan-T, 60 pounds of Amatex-923 and 1.5 pounds of the surface active agent Triton X-120, the alkylaryl polyether alcohol

[p-$C_8H_{17}C_6H_4(OCH_2CH_2)_nOH$ where $C_8H_{17}$ is diisobutyl]

adsorbed on magnesium carbonate, is blended to a free-flowing powder in a ribbon blender. The blend is then mixed with kerosene in a weight ratio of about 2 pounds of kerosene per pound of blend to form a slurry which is then slowly poured into a quantity of water sufficient to produce a 0.8%, by weight, solution with continuous agitation. To this mixture is added 14.25 pounds of the diamine salt formulation of 2,4,5–T. The resulting material is a lump-free viscous pesticidal spray composition. These-lump-free, viscous characteristics for pesticidal spray compositions are found to be also typical of like formulations, except containing as pesticidal agents between about 2–10 volume percent of one of the following substituents: 2,4–D, 2,4,5–T, diethanolamine salt of 2,4–D, butyl ester of 2,4,5–T, the same ester of 2,4–D, the 2-ethyl, hexyl ester of 2,4–D, and such ester of 2,4,5–T.

The composition resulting from the diamine salt formulation of 2,4,5–T is sprayed from a conventional spray rig at a concentration of 6 pounds of acid equivalent per acre onto a field containing long leaf pine, scrub oak, bay, titi, sourwood, and yellow poplar which plants have attained a maximum height of about 8 feet. About 4 weeks following the spray application estimates are made by visual inspection on the percent of the brush controlled and by such observation the application is seen to be as effective for brush control as a spray application of 4-amino-3,5,6-trichloropicolinic acid applied in recommended manner.

It is to be understood that, although the invention has been described with specific reference to particular embodiments thereof, it is not to be so limited, since changes and alterations therein may be made which are within the full intended scope of this invention as defined by the appended claims.

What is claimed is:

1. A process for preparing a viscous, thixotropic and aggregate free spray composition, which is smooth flowing in spray application and has enhanced spray drift control, said composition having distributed therein herbicidal agent which process comprises the steps of:

(A) mixing an admixture of about 20–80 weight percent locust bean gum and about 80–20 weight percent of a heteropolysaccharide, and about 0.1–10 weight percent of a surface active agent, basis 100 weight percent of said admixture, with an organic liquid, which is liquid about 20° F., in a weight ratio of liquid to admixture plus agent of from about 0.5 to 5:1, forming a free-flowing slurry of said admixture, agent, and liquid;

(B) mixing a water-containing liquid diluent, the major portion of said diluent being supplied by water, with all, if any of solid, water-insoluble herbicidal agent for said composition, thereby preparing a resulting liquid diluent;

(C) blending said slurry with said resulting liquid diluent in an amount sufficient to produce a slurry-liquid diluent mixture for spray application; and (D) admixing said slurry-liquid diluent mixture with all, if any of liquid, water-emulsifiable herbicidal agent for such composition with the proviso that water soluble herbicidal agent may be added by incorporation into said process with other herbicidal agent.

2. The process of claim 1 wherein said admixture and surface active agent are premixed to prepare a free-flowing homogeneous blend, said slurry and resulting liquid diluent are blended in a volume ratio of slurry to liquid diluent of from about 0.01–0.1:1, and the composition is free from solid, water-insoluble herbicidal agent.

3. A spraying composition prepared by the method of claim 1 comprising about 0.03% to 10%, by weight of of a herbicidal agent; about 0.2% to 1%, by weight of an adjuvant comprising an admixture of about 20% to 80% by weight of a heteropolysaccharide, about 20% to 80% by weight of locust bean gum and about 0.1% to 10% by weight of a surface active agent; and the remaining 99.77% to 89% comprising a mixture of an organic liquid, which is liquid above 20° F., and water-containing liquid diluent, the major portion of said diluent being supplied by water.

References Cited

UNITED STATES PATENTS

| | | | |
|---|---|---|---|
| 3,360,356 | 12/1967 | Vartiak | 71—65 |
| 3,484,229 | 12/1969 | Floyd et al. | 71—79 |
| 2,558,762 | 7/1951 | Kohr et al. | 71—110 |
| 2,927,055 | 3/1960 | Lanzet | 424—76 |
| 3,054,689 | 9/1962 | Jeanes et al. | 106—208 |
| 3,157,486 | 11/1964 | Harrison et al. | 71—93 |
| 3,244,695 | 4/1966 | Schweiger. | |
| 3,251,768 | 5/1966 | Walker | 260—209 |
| 3,438,915 | 4/1969 | Girard | 260—209 |

FOREIGN PATENTS

| | | | |
|---|---|---|---|
| 851,250 | 10/1960 | Great Britain | 71—93 |
| 630,023 | 10/1949 | Great Britain | 71—117 |

OTHER REFERENCES

C&E News, "New Pesticide Spray Methods Due This Spring," C&E News Mar. 28, 1966, pp. 42–43.

JAMES O. THOMAS, JR., Primary Examiner

G. HOLLRAH, Assistant Examiner

U.S. Cl. X.R.

71—70, 79, 86, 87, 92, 93, 94, 108, 109, 110, 111, 114, 116, 117, 120, DIG. 1; 424—361, 363